(12) United States Patent
Miltenberger et al.

(10) Patent No.: US 7,685,905 B2
(45) Date of Patent: Mar. 30, 2010

(54) STEERING WHEEL FOR A MOTOR VEHICLE

(75) Inventors: Michael Miltenberger, Heusenstamm (DE); Stefan Faeth, Aschaffenburg (DE); Stefan Bachmann, Goldbach (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 741 days.

(21) Appl. No.: 11/127,575

(22) Filed: May 12, 2005

(65) Prior Publication Data

US 2005/0252332 A1    Nov. 17, 2005

(30) Foreign Application Priority Data

May 14, 2004    (DE) .............. 10 2004 024 053
Jun. 8, 2004    (DE) .............. 10 2004 027 870

(51) Int. Cl.
*B62D 1/04* (2006.01)
(52) U.S. Cl. ........................................ 74/552
(58) Field of Classification Search ............ 74/552, 74/553, 557; 280/731
See application file for complete search history.

(56) References Cited

U.S. PATENT DOCUMENTS

| | | | | |
|---|---|---|---|---|
| 4,920,822 A * | 5/1990 | Abiko | ................ | 74/552 |
| 6,481,312 B1 * | 11/2002 | Wissel | ................ | 74/552 |
| 6,668,682 B1 * | 12/2003 | Emeneth et al. | ................ | 74/552 |
| 6,889,436 B2 * | 5/2005 | Derrick | ................ | 29/894.1 |
| 6,928,898 B2 * | 8/2005 | Albayrak et al. | ................ | 74/552 |
| 2002/0023517 A1 * | 2/2002 | Ochiai et al. | ................ | 74/552 |
| 2003/0172769 A1 * | 9/2003 | Ito et al. | ................ | 74/552 |
| 2003/0213332 A1 * | 11/2003 | Hayashi et al. | ................ | 74/552 |
| 2004/0050204 A1 * | 3/2004 | Albayrak et al. | ................ | 74/552 |

FOREIGN PATENT DOCUMENTS

| | | |
|---|---|---|
| DE | 4418960 | 12/1995 |
| DE | 19846824 | 4/2000 |
| EP | 0820914 | 1/1998 |
| EP | 0849127 | 6/1998 |
| JP | 2002326575 | 11/2002 |

\* cited by examiner

*Primary Examiner*—Vicky A Johnson
(74) *Attorney, Agent, or Firm*—Tarolli, Sundheim, Covell & Tummino LLP

(57) ABSTRACT

A steering wheel for a motor vehicle includes a skeleton (10) and a rear-side covering part. The skeleton forms a hub (12), at least one spoke (14) and an upper part (16) of a steering wheel rim. The steering wheel also includes a rear-side covering part (18) made of plastic, which at least partially covers a lower area of the central part of the steering wheel and also constitutes a lower part of the steering wheel rim.

9 Claims, 3 Drawing Sheets

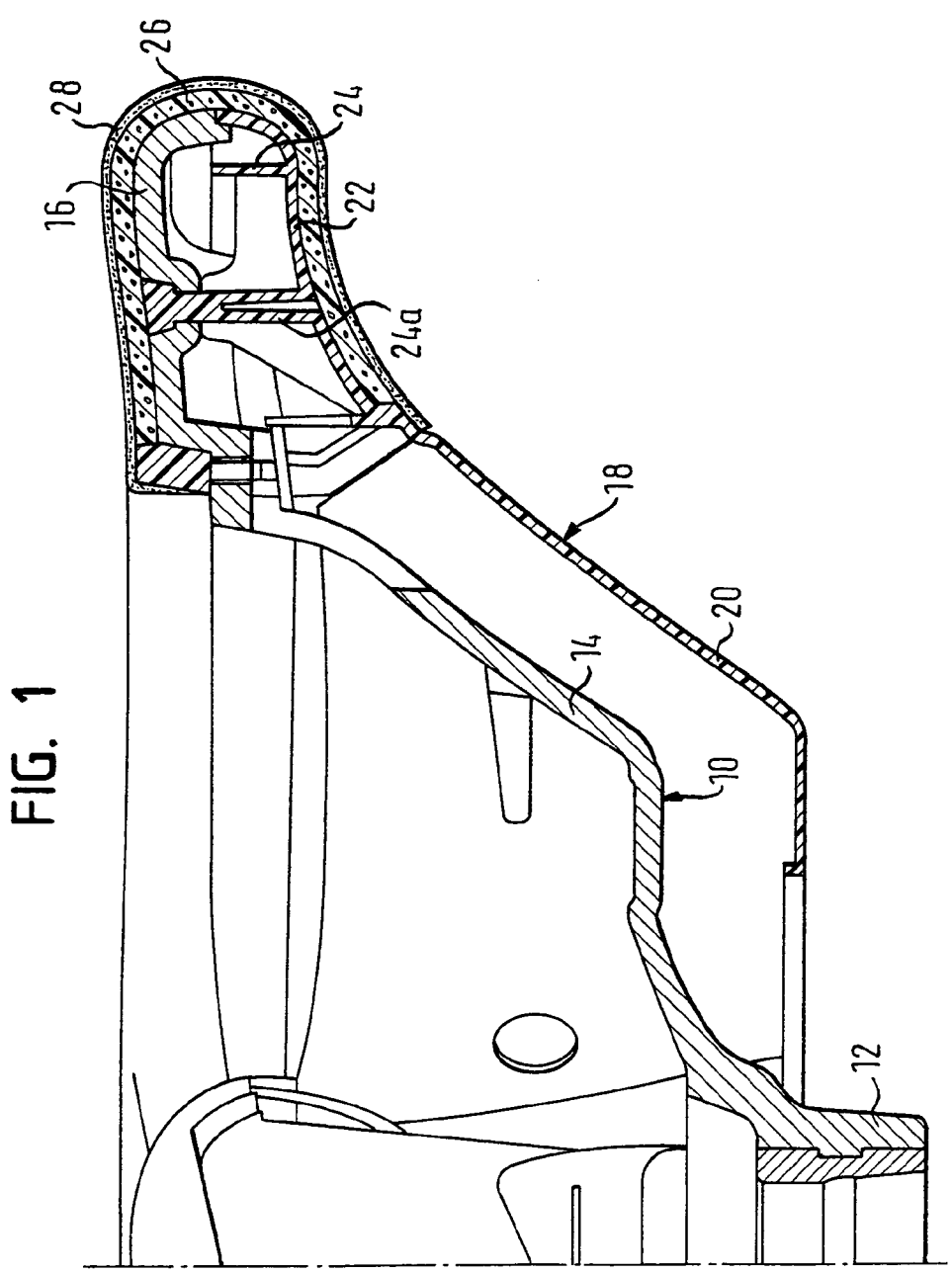

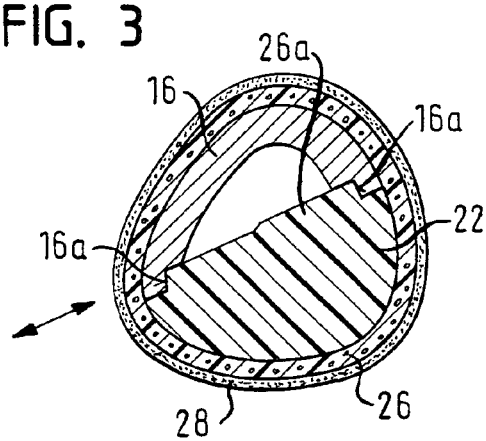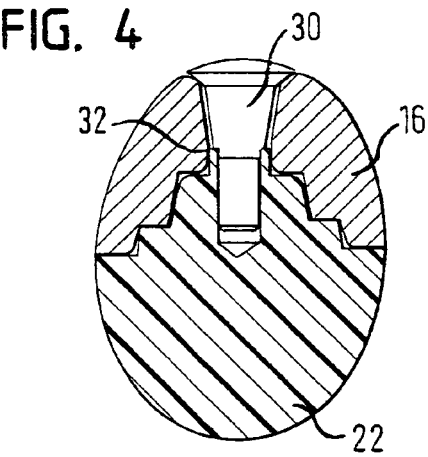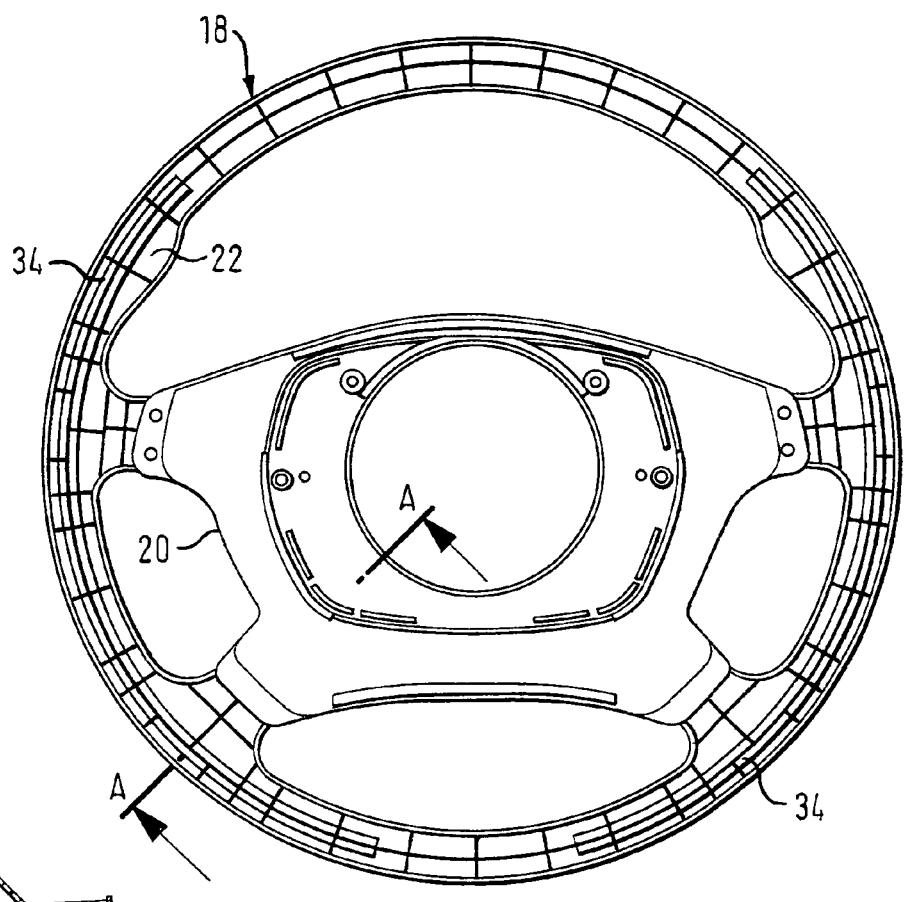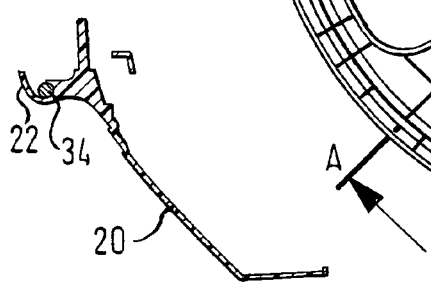

STEERING WHEEL FOR A MOTOR VEHICLE

TECHNICAL FIELD

The present invention relates to a steering wheel for a motor vehicle, in particular a steering wheel having a steering wheel skeleton which is not encased in foam or plastic. The invention further relates to a method for manufacturing a steering wheel.

BACKGROUND OF THE INVENTION

When the skeleton of a steering wheel is encased in foam or plastic, in particular the steering wheel rim takes on its final exterior shape, which is then supplemented only by thin layers (e.g. leather). Although it is possible to economize on costs in manufacturing a steering wheel by eliminating the expensive foam-encasing process, steering wheels should nevertheless continue to be haptically pleasant for the driver to grip. In the case of steering wheels of this type, a fundamental problem lies in the fact that it is very expensive to reproduce the closed cross sectional profile of the steering wheel rim (that is usually generated by the foam-encasing process) by using a metal steering wheel skeleton. In addition, it is also necessary to take into account the increased weight caused by increasing the rim area of the steering wheel skeleton.

In European Patent Application EP A 1 264 756 a steering wheel is described that has a rim formed by a hollow profile. The hollow profile is shaped from an annular section of a sheet metal skeleton and, in accordance with one of the embodiments proposed therein, is directly covered with leather. A projection of an additional body arranged within the hollow profile assures a closed exterior surface of the hollow profile.

From German Patent Application DE A 100 59 133 a steering wheel is known in which a soft foam is glued to a single-piece steering wheel skeleton. The soft foam is in turn covered by leather. The exterior geometry of the steering wheel rim is defined by a rim area of the steering wheel skeleton. To reduce the weight of the steering wheel rim and thus reduce the tendency of the steering wheel to vibrate, recesses are provided in the rim area of the steering wheel skeleton. Various measures have been proposed to cover over the recesses so that they are no longer palpable to the hand.

It is an object of the invention to provide a vehicle steering wheel that is light in weight and easy to install. It is a further object to provide a vehicle steering wheel that can be manufactured without encasing the steering wheel skeleton in foam, but that nevertheless fulfills all of the haptic requirements.

BRIEF SUMMARY OF THE INVENTION

According to the invention, a steering wheel for a motor vehicle is proposed, comprising a skeleton and a rear-side covering part. The skeleton forms a hub, at least one spoke and an upper part of a steering wheel rim. The rear-side covering part is made of plastic and at least partially covers a lower area of the central part of the steering wheel. The rear-side covering part also constitutes a lower part of the steering wheel. The unique feature of the steering wheel according to the present invention lies in the fact that the steering wheel rim is not completely formed by a closed profile of the metal skeleton, which is difficult to manufacture. Rather, the present invention provides that the steering wheel rim is only partially defined by the skeleton. The skeleton of the steering wheel according to the present invention is therefore no longer a skeleton in the usual sense, but rather a reinforcement. The cross sectional profile of the steering wheel rim is supplemented, or closed, by the plastic covering part, which simultaneously functions to cover the lower area of the steering wheel central part. In this way, significant savings in weight are achieved without requiring recesses in the steering wheel rim.

In the preferred embodiment of the present invention, at least one rib is formed on the covering part. The covering part is advantageously joined to the skeleton in that at least one of the molded ribs is attached to the skeleton by an ultrasonic welding, heat caulking, screw, glue, or snap-action hook connection.

According to one refinement of the present invention, at least one insert is provided that is attached to the covering part. An insert of this type, which is preferably made of steel, increases the mass moment of inertia of the steering wheel. Arranging and attaching the insert on the covering part enables a flexible configuration of the insert, so that various predetermined requirements can be met.

The insert is preferably integrated in the covering part, so that when the covering part is manufactured in a plastic injection molding process, the insert can be encased in plastic at the same time. In this manner, no additional attachment for the insert, which would otherwise be necessary, is required in order to avoid any relative motion between the components.

The possibility of noise being produced by the insert can be excluded by encasing the insert in plastic, especially if the insert is completely encased in plastic.

In addition, the present invention provides a method for manufacturing a steering wheel according to the present invention, the method comprising the following steps:

manufacturing the skeleton including the hub, the at least one spoke and the upper part of the steering wheel rim, by casting or injection molding, and attaching to the skeleton the rear-side covering part.

BRIEF DESCRIPTION OF THE DRAWINGS

FIG. 1 depicts a cross section of one half of a steering wheel according to the present invention in the area of a spoke;

FIG. 2 depicts a cross section of the rim of the steering wheel from FIG. 1 in the vicinity of a spoke according to a first embodiment;

FIG. 3 depicts a cross section of the steering wheel rim according to a second embodiment;

FIG. 4 depicts a cross section of the steering wheel rim according to a third embodiment;

FIG. 5 depicts a top view of a rear-side covering part of a steering wheel according to the present invention;

FIG. 6 depicts a sectional view along the line A-A in FIG. 5; and

DETAILED DESCRIPTION OF THE PREFERRED EMBODIMENT

Figure 7:
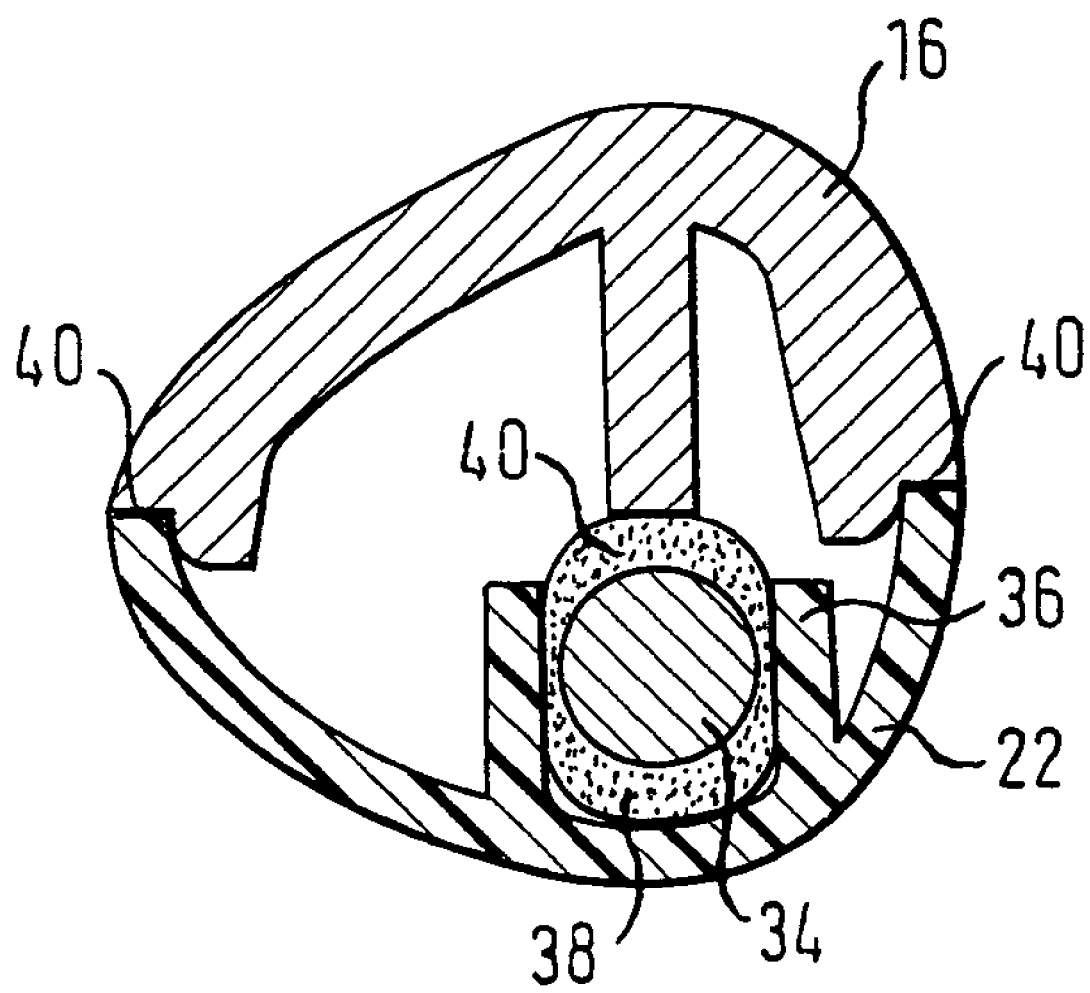
FIG. 7 depicts a cross section of the rim of a steering wheel according to a further embodiment.

As can be seen in FIG. 1, the steering wheel according to the present invention includes a skeleton 10 that is manufactured in one piece by die casting or injection molding. The skeleton can be subdivided essentially into three parts: a hub 12, a plurality of spokes 14 (of which only one is depicted) and an upper part 16 of a steering wheel rim. Because the geometry of the steering wheel in the area of the other, undepicted spokes is substantially the same as in the area depicted in FIG. 1 and because the spokes are uniformly distributed over the circumference, the half view depicted in FIG. 1 is sufficient to define the geometry of the steering wheel in the part that is essential for the present invention.

The steering wheel also includes a rear-side covering part 18 made of plastic. A first section 20 of the covering part 18 covers a large part of the lower area of the central part of the steering wheel, in which an airbag module can be accommodated in a familiar manner, up to the hub 12. A second section 22 of the covering part 18 forms a lower steering wheel rim part supplementing the upper steering wheel rim part 16. Thus, the steering wheel rim of the steering wheel according to the present invention is constituted by these two components. Covering part 18 has a plurality of molded reinforcing or supporting ribs 24. In FIG. 1 it can be seen that covering part 18 is connected to skeleton 10 by an attaching rib 24a in the vicinity of the steering wheel rim. Covering part 18 is permanently attached to skeleton 10 via rib 24a by an ultrasonic welding, heat caulking, screw, glue, or snap-action hook connection.

No dish-shaped injection-molded part or foam-encased part is placed upon the steering wheel rim that is formed by upper steering wheel rim part 16 of skeleton 10 and the lower steering wheel rim part of covering part 18. Moreover, the steering wheel rim is not encased in plastic or foam. Rather, as can be seen in the cross sectional view of FIG. 2, an intermediate layer 26 of soft foam (e.g., cellular rubber) is attached directly to the steering wheel rim. On the exterior side an additional leather covering 28 made of stamped leather is attached directly to the soft foam. Intermediate layer 26 is attached to skeleton 10 and leather covering 28 is attached to intermediate layer 26, preferably by glue.

Intermediate layer 26 is made of a thin soft foam sheet that is planar in the unattached state and that has a stamped contour. The thickness of this flexible sheet is constant, as is that of leather covering 28. The total thickness of intermediate layer 26 and leather covering 28 is roughly 3 mm, so that skeleton 10 and covering part 18, more precisely the upper steering wheel rim part 16 of skeleton 10 and the second section 22 of covering part 18 constituting the lower steering wheel rim part, define the exterior geometry of the finished and covered steering wheel rim, which is depicted in FIG. 1.

First section 20 of covering part 18, which is not covered by intermediate layer 26 and leather covering 28, defines the exterior geometry of the central part of the steering wheel. In the embodiment depicted in FIG. 1, covering part 18 represents the visible exterior wall of the steering wheel central part.

To manufacture a steering wheel according to the present invention, skeleton 10 including hub 12, at least one spoke 14 and upper part 16 of the steering wheel rim, is first manufactured by casting or injection molding. Rear-side covering part 18 made of plastic, which at least partially covers the central part of the steering wheel and constitutes the lower part of the steering wheel rim, is attached to skeleton 10, preferably by an ultrasonic welding, heat caulking, screw, glue, or snap-action hook connection. Then, intermediate layer 26 of soft foam is directly attached to the steering wheel rim, and leather covering 28 is directly attached to intermediate layer 26. Alternatively, a covering made of intermediate layer 26 and leather covering 28 attached thereto can be manufactured in advance and then be attached to the steering wheel rim, intermediate layer 26 functioning as the interior side.

FIG. 3 depicts an embodiment in which section 22 of plastic covering part 18 has a stepped elevation 26a, which is received in corresponding interior recesses 16a of skeleton part 16. As a result of this contouring, covering part 18 is supported by skeleton 10 in the two directions designated by arrows.

In the embodiment depicted in FIG. 4 (without leather covering), section 22 of plastic covering part 18 is supported on upper steering wheel rim part 16 by a dowel connection. Section 22 and upper steering wheel rim part 16 have a complementary stepped profile. When dowel 30 is driven into section 22, the thread of dowel 30 locks in the plastic of section 22. In addition, a circumferential lip 32 of section 22 is prestressed against upper steering wheel rim part 16 by dowel 30, which expands in the direction of upper steering wheel rim part 16. Thus a doubly secure connection is achieved.

In FIGS. 5 and 6, a covering part 18 of a steering wheel according to the present invention is depicted having two steel inserts 34. The steel inserts are symmetrically arranged and have a predetermined thickness and length. Steel inserts 34 are integrated in section 22 of covering part 18, i.e., when covering part 18 is manufactured by plastic injection molding, inserts 34 are encased in plastic at the same time. Steel inserts 34, with respect to their cross sectional profile, can be encased in plastic either completely or only partially. During the injection molding process, steel inserts 34 are held in position using a magnetic dome.

In the embodiment depicted in FIG. 7, steel insert 34 is not injected into section 22, but is rather glued to it. Before the gluing process, the position of insert 34 is fixed by bars 36 and/or a support dome. Glue is applied through a nozzle at specific locations 38 on the interior side of section 22, before upper steering wheel rim part 16 is then attached. In the event that upper steering wheel part 16 is glued to section 22 via adhering surfaces, or adhering locations 40, the gluing of steel insert 34 is accomplished in the same working step.

The invention claimed is:

1. A steering wheel for a motor vehicle, the steering wheel comprising a skeleton and a rear-side covering part,
   the skeleton forming a hub, at least one spoke and only an upper part of a steering wheel rim,
   the rear-side covering part being made of plastic and at least partially covering a lower area of a central part of the steering wheel, at least one rib being formed in the rear-side covering part,
   the rear-side covering part also constituting only a lower part of the steering wheel rim which complements the upper part of the steering wheel rim formed by the skeleton.

2. The steering wheel as recited in claim 1, wherein an intermediate layer of soft foam is attached directly to the steering wheel rim and the rear-side covering part and completely surrounds both the steering wheel rim and the rear-side covering part, a leather covering being attached directly to the intermediate layer and being the outermost layer of the steering wheel rim.

3. The steering wheel as recited in claim 2, wherein the steering wheel rim, which is formed by the skeleton and the covering part, defines the exterior geometry of the steering wheel rim provided with the intermediate layer and the leather covering.

4. The steering wheel as recited in claim 2, wherein the total thickness of the intermediate layer and the leather covering does not substantially exceed 3 mm.

5. The steering wheel as recited in claim 1, wherein the covering part defines the exterior geometry of the lower area of the central part of the steering wheel.

6. The steering wheel as recited in claim 1, wherein at least one of the ribs is attached to the skeleton by one of an ultrasonic welding, heat caulking, screw, glue, and snap-action hook connection.

7. The steering wheel as recited in claim 1, wherein at least one insert is provided in the steering wheel rim as formed by the skeleton and the covering part and is attached to the covering part.

8. The steering wheel as recited in claim 7, wherein the insert is integrated in the covering part.

9. The steering wheel as recited in claim 1, wherein the upper and lower parts of the steering wheel rim formed by the skeleton and by the rear-side covering part form a steering wheel rim having a relatively round outer surface.

* * * * *